United States Patent
Phoenix et al.

[11] 3,897,677
[45] Aug. 5, 1975

[54] HARVESTING MACHINES

[75] Inventors: Lancelot Phoenix, Birmingham;
John William Euclid Walker, Solihull; Alan George Mather, Sutton Coldfield, all of England

[73] Assignee: Lucas Electrical Company Limited, Birmingham, England

[22] Filed: Oct. 5, 1973

[21] Appl. No.: 403,890

[30] Foreign Application Priority Data
May 10, 1972 United Kingdom............ 45926/72

[52] U.S. Cl............ 56/10.2; 56/DIG. 15; 130/27 W
[51] Int. Cl.² .................................... A01D 75/28
[58] Field of Search................ 56/10.2, DIG. 15; 130/27 R, 27 H; 340/271

[56] References Cited
UNITED STATES PATENTS
3,073,099  1/1963  Andersen................ 56/DIG. 15
3,368,214  2/1968  Swanson.................. 340/271
3,609,947  10/1971 Herbsthofer............... 56/10.2

FOREIGN PATENTS OR APPLICATIONS
234,307  6/1961  Australia................ 56/DIG. 15

Primary Examiner—Russell R. Kinsey
Attorney, Agent, or Firm—Holman & Stern

[57] ABSTRACT

A harvesting machine has a rotor for lifting the crop from the ground and an elevator for lifting the crop from the rotor to a cylinder and associated concave for separating the crop. The elevator is mounted for angular movement about a horizontal axis at its upper end, and if the angle of elevation of the elevator exceeds a predetermined value, subsequently the cylinder and concave are likely to jam, a warning is given or a control is effected. In one arrangement, not only the angle of elevation is measured, but the time for which the elevator is in an elevated position.

3 Claims, 2 Drawing Figures

HARVESTING MACHINES

This invention relates to harvesting machines of the kind including a concave and associated cylinder for effecting the required separation of the crop, a rotor for lifting the crop from the ground, and an elevator for lifting the crop from the rotor to the cylinder, the elevator being mounted for angular movement about a horizontal axis at its upper end.

The invention resides in a machine of the kind specified including means sensitive to the angle of elevation of the elevator for giving a warning or effecting a control if the cylinder and concave are likely to jam.

In one arrangement, the means is sensitive only to the angle of elevation of the elevator. In another arrangement, the means is sensitive to the angle of elevation and the time for which the elevator is in an elevated position.

Figure 1:
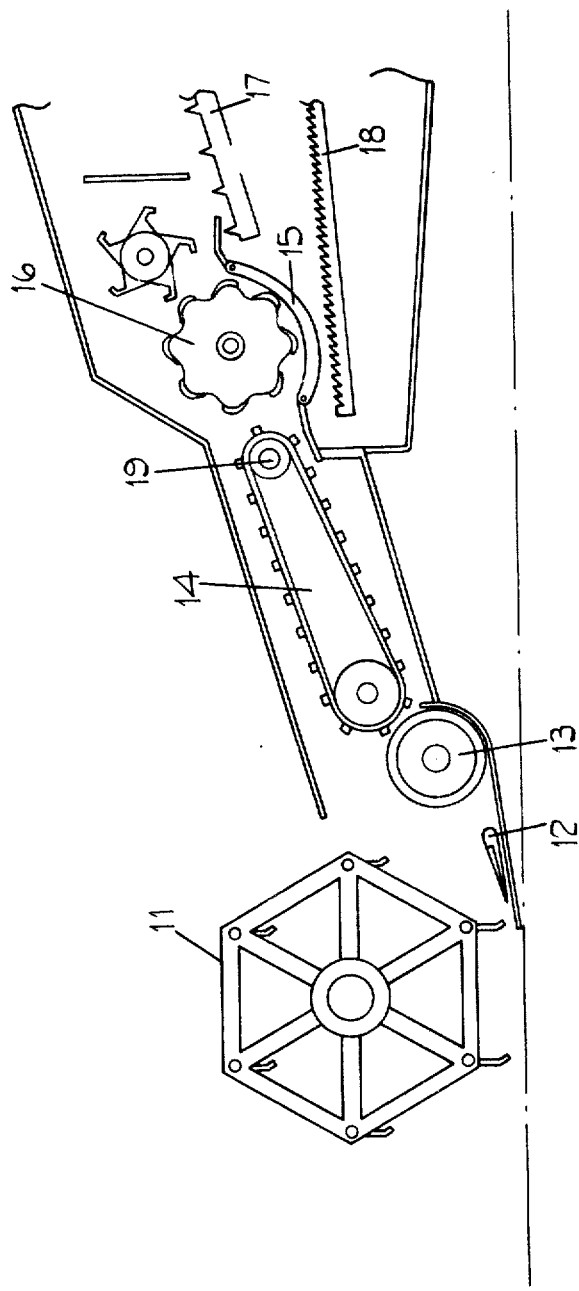
Figure 2:
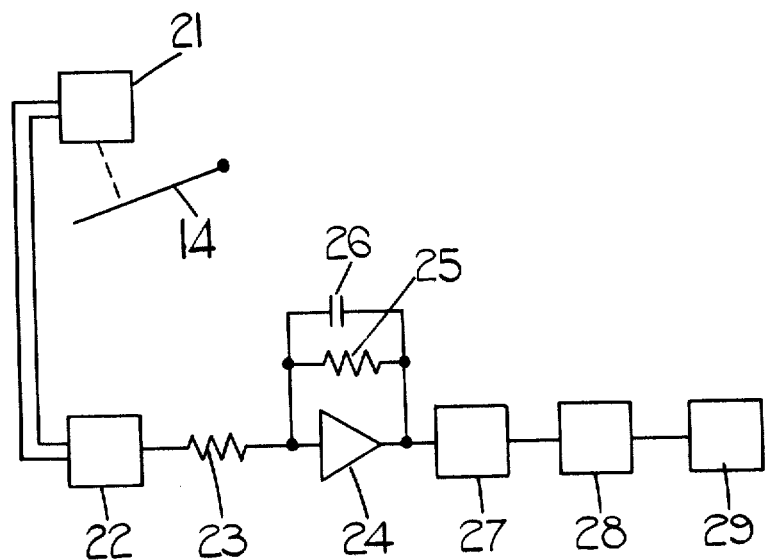

In the accompanying drawings,

FIG. 1 is a side view illustrating diagrammatically one form of harvesting machine to which the invention can be applied, and FIG. 2 is a block diagram illustrating one example of the invention.

Referring to FIG. 1, there is provided a rotor 11 which is driven by the engine of the machine, and which picks up the crop from the ground. The crop is cut by a cutter 12 and fed to a shaft 13 having at each end thereof a helical thread, the arrangement being such that the crop is fed from each end of the rotor towards the centre of the machine. The crop is then picked up by fingers on an elevator 14, the elevator 14 lifting the crop and depositing it between a conventional concave 15 and associated cylinder 16. The concave 15 and cylinder 16 separate the grain, which is fed to a pair of grain conveyors 17, 18.

The elevator 14 is pivoted about its upper horizontal axis 19 so that the entire elevator 14 can lift if necessary to accommodate the crop trapped by the fingers of the elevator. All the components 11, 12, 13, 14 are mounted on a platform the height of which can be adjusted to suit the crop being harvested.

Referring now to FIG. 2, the elevator 14 is indicated diagrammatically, and has associated therewith a transducer 21 which produces an output signal representing the angle at which the elevator is positioned at any given instant. This signal is fed to an amplifier 22 which provides an input by way of a resistor 23 to an operational amplifier 24 having a resistor 25 and a capacitor 26 in parallel in its feedback circuit. The operational amplifier 24 integrates the signal it receives and passes an output to a comparator 27, the output from which is fed through a further amplifier 28 to warning or control means 29.

The transducer 21 can be resistive, inductive, capacitive or optical, and the arrangement is such that when the elevator 14 is in its normal position, then the comparator 27 does not produce an output. However, if excess crop is fed by way of the elevator to the concave and cylinder, then the excess crop will lift the elevator 14, and the lifting of the elevator 14 will be detected by the transducer 21. The angle at which the elevator is positioned is integrated with respect to time, and if the amount of crop causing the lifting of the elevator 14 is such that there is a likelihood of jamming of the concave and cylinder, then the input to the comparator 27 is sufficient to cause the comparator 27 to produce an output which is amplified by the amplifier 28 and operates the warning or control means 29. The means 29 can operate a warning, but instead of, or in addition to, operating the warning it can effect any one or more of a variety of controls, for example stopping the cylinder, lifting the table and stopping the machine.

If desired, the arrangement may be such that the machine attempts to cure the jam automatically as soon as a potential jam is sensed. This can be done by operating means for adjusting the relative positions of the cylinder and concave, or by reversing the direction of rotation of the cylinder. Moreover, in some arrangements it may be desirable when a potential jam is detected merely to give a warning to the operator, so that the operator can take steps to prevent the jam by suitable adjustment of the machine. If the operator fails to take the appropriate steps, then a control can be effected in any of the ways described above. There could be a simple time delay between giving the warning and effecting the control, so that if the fault is removed during the time delay the control is not effected. Alternatively, two signals could be obtained, one when a jam is imminent, at which point the control is effected, and one somewhat sooner, when the warning is given.

We claim:

1. A harvesting machine comprising in combination a concave and associated cylinder for effecting the required separation of the crop, a rotor for lifting the crop from the ground, an elevator for lifting the crop from the rotor to the cylinder, the elevator being mounted for angular movement about a horizontal axis at its upper end, and means sensitive to the angle of elevation of the elevator and the time for which the elevator is in an elevated position for providing an electrical output control signal if the cylinder and concave are likely to jam, said elevator angle and time sensitive means comprising angle transducer means coupled to said elevator for providing an output electrical signal indicative of the elevation angle thereof, electrical integration means for integrating said output electrical signal, and means responsive to the integrated output of said electrical integration means for producing said electrical output control signal.

2. The machine as set forth in claim 1, wherein said electrical integration means comprises an operational amplifier connected as an integrator.

3. The machine as set forth in claim 2, wherein said means responsive to the integrated output of said operational amplifier comprises a comparator.

* * * * *